(12) United States Patent
Brandt

(10) Patent No.: US 7,623,707 B2
(45) Date of Patent: Nov. 24, 2009

(54) HIERARCHICALLY LOCATING A FEATURE IN A DIGITAL IMAGE

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 831 days.

(21) Appl. No.: 11/096,349

(22) Filed: Apr. 1, 2005

(65) Prior Publication Data

US 2006/0056687 A1 Mar. 16, 2006

Related U.S. Application Data

(63) Continuation-in-part of application No. PCT/US2004/030382, filed on Sep. 15, 2004.

(51) Int. Cl.
*G06K 9/00* (2006.01)
(52) U.S. Cl. .................................... 382/167
(58) Field of Classification Search .................. None
See application file for complete search history.

(56) References Cited

U.S. PATENT DOCUMENTS

| | | | |
|---|---|---|---|
| 5,432,863 A | 7/1995 | Benati et al. | |
| 5,583,974 A | 12/1996 | Winner et al. | |
| 6,144,754 A | 11/2000 | Okano et al. | |
| 6,252,976 B1 | 6/2001 | Schildkraut et al. | |
| 6,292,574 B1 * | 9/2001 | Schildkraut et al. | 382/117 |
| 6,714,665 B1 * | 3/2004 | Hanna et al. | 382/117 |
| 6,885,760 B2 * | 4/2005 | Yamada et al. | 382/118 |
| 6,885,761 B2 * | 4/2005 | Kage | 382/118 |
| 6,885,766 B2 * | 4/2005 | Held et al. | 382/167 |
| 7,155,058 B2 * | 12/2006 | Gaubatz et al. | 382/167 |

FOREIGN PATENT DOCUMENTS

| | | |
|---|---|---|
| EP | 1 223 550 | 7/2002 |
| EP | 1 271 394 | 1/2003 |

OTHER PUBLICATIONS

Schneiderman et al, "A Statistical Method for 3D Object Detection Applied to Faces and Cars", Proc. CVPR 2000, vol. I, pp. 746-752.*
Camus, et al. "Reliable and Fast Eye Finding in Close-Up Images", Proceedings of the 16th International Conference on Pattern Recognition, IEEE, Aug. 11, 2002 pp. 389-394.

(Continued)

*Primary Examiner*—Yuzhen Ge
(74) *Attorney, Agent, or Firm*—Fish & Richardson P.C.

(57) ABSTRACT

Methods, systems, and computer program products used to locate a feature in a digital image. A first search is performed in the image to find candidate faces, where each candidate face found is a group of pixels in the image that satisfies a first pattern-matching criterion. A second search is performed in the image to find candidate eyes, where each candidate eye found is a group of pixels in the image that satisfies a second pattern-matching criterion. A third search is performed within each candidate face that includes at least one overlapping candidate eye to find red pupils, where each red pupil found is a group of pixels in the image. A color modification process is applied to the red pupils.

24 Claims, 5 Drawing Sheets

OTHER PUBLICATIONS

Colorpilot, "Remove Red Eye—New Algorithm", Retrieved from the Intenet http://www.colorpilot.com/redeye.html?adwords, Retrieved on Aug. 24, 2004, 2 pages.

Fukui, et al. "Facial Feature Point Extraction Method Based on Combination of Shape Extraction and Pattern Matching", Systems and Computers in Japan Scripta Technica USA, vol. 29, No. 6, Jun. 15, 1998, pp. 49-58.

Gaubatz, et al. "Automatic Red-Eye Detection and Correction", IEEE 2002 International Conference on Image Processing, Rochester, New York, Sep. 22-25, 2002, pp. I-804 to I-807.

Hwang, "Pupil Detection in Photo ID", Image Procesing: Algorithms and Systems III, San Jose, CA, USA, vol. 5298, No. 1, Jan. 19, 2004, pp. 82-87.

Jasc Software "Iris Color Change", Retrieved from the Internet http://www/jasc.com/support/learn/tutorials/archive/paintshoppro/red-eye3.asp?pg=1, Retrieved on Aug. 24, 2004, 3 pages.

Jasc Software "Red-Eye Correction", Retrieved from the Internet http://www/jasc.com/support/learn/tutorials/archive/paintshoppro/red-eye2.asp?pg=1, Retrieved on Aug. 24, 2004, 3 pages.

Luo, et al. "An Efficient Automatic Redeye Detection and Correction Algorithm", 17th International Conference on Pattern Recognition, Cambridge, UK, Aug. 23-26, 2004, 4 pages.

Rizon, et al. "Automatic Eye Detection Using Intensity and Edge Information", 2000 Tencon Proceedings, Intelligent Systems and Technologies for the New Millennium, IEEE, vol. 2, Sep. 24, 2000, pp. 415-420.

Schildkraut, et al. "A Fully Automatic Redeye Detection and Correction Algorithm", IEEE 2002 International Conference on Image Processing, Rochester, New York, Sep. 22-25, 2002, pp. I-801 to I-803. PDF.

Smolka, et al. "Towards Automatic Redeye Effect Removal", Pattern Recognition Letters, North-Holland Publ., Amsterdam, NL, vol. 24, No. 11, Jul. 2003, pp. 1767-1785.

Stoik,"Stoik RedEye Autofix", Retrieved from the Internet http://www/stoik.com/stoik_red_eye/STOIK_RedEye_Autofix.htm, Retrieved on Aug. 24, 2004, 4 pages.

Ulichney, et al. "RedBot—a tool for improving red-eye correction", IS&T/SID's Eleventh Color Imaging Conference, Scottsdale, Arizona, Nov. 4-7, 2003, 1 page.

Yuille, et al. "Feature Extraction from Faces Using Deformable Templates", International Journal of Computer Vision, Springer Science+Business Media B.V., vol. 8, No. 2, Aug. 1992, pp. 99-111.

Zhu, et al. "A Fast Automatic Extraction Algorithm of Elliptic Object Groups From Remote Sensing Images", Pattern Recognition Letters, North-Holland Publ., Amsterdam, NL, vol. 25, No, 13, Jul. 6, 2004, pp. 1471-1478.

Kawaguchi, T. and M. Rizon, "Iris detection using intensity and edge information," Pattern Recognition 36: 549-562 (2003).

Sobottka, K. and I. Pitas, "A novel method for automatic face segmentation, facial feature extraction and tracking," Signal Processing: Image Communication 12: 263-281 (1998).

Jones et al., "Fast Multi-view Face Detection", CVPR demo, Mitsubishi Electric Research Laboratories TR2003-96, http://www.merl.com (2003).

Lubomir Bourdev, et al., "Detecting Objects In Images Using A Soft Cascade", U.S. Appl. No. 11/042,942, filed Jan. 4, 2005.

Viola et al., "Robust Real-time Object Detection", 2nd International Workshop on Statistical and Computational Theories of Vision—Modeling, Learning, Computing, and Sampling, Vancouver, CA (Jul. 13, 2001).

Wright, M.H., AT&T Bell Labs, "Direct Search Methods: Once Scorned, Now Respectable", *Proceedings of the 1995 Dundee Biennial Conference in Numerical Analysis*, D.F. Grifiths and G.A. Watson, eds., Addison Wesley Longman, Harlow, UK, pp. 191-208 (1996).

Yang et al., "Detecting Faces in Images: A Survey", IEEE Transactions on Pattern Analysis and Machine Intelligence, 24(1) (Jan. 2002).

* cited by examiner

HIERARCHICALLY LOCATING A FEATURE IN A DIGITAL IMAGE

CLAIM OF PRIORITY

This application is a continuation-in-part of Patent Cooperation Treaty International Application No. PCT/US2004/030382, filed on Sep. 15, 2004, the entire contents of which are hereby incorporated by reference.

BACKGROUND

The present invention relates to digital image processing.

Locating pupils in a digital image is useful in some situations. For example, flash photographs of people frequently result in a red-eye effect that can be corrected if the location of the pupil is known. The red-eye effect is a consequence of the flash illumination reflecting off of the subject's retina, returning to the camera, and appearing as a bright red dot where the pupil should be. Similar effects occur with photographs of animals, although the dot color can be different (e.g., green or yellow). Computer applications for editing images typically include tools to assist a user in correcting the red-eye effect—usually by replacing the red pupil with a more natural-looking pupil. In order to avoid requiring the user to designate precisely which pixels constitute the pupil to be corrected, such a tool can include a detector that determines the pupil position and shape to within some margin of error. In order to be sufficiently reliable, such a detector typically requires (through user action) a rough initial hint of the pupil location and size.

SUMMARY

In one aspect, the invention features a method that includes identifying one or more candidate features in an image, where each candidate feature is a group of pixels in the image that satisfies a pattern-matching criterion. A best candidate feature is selected from the one or more candidate features, and a parameterized shape is fit to the image in the region of the best candidate feature to compute a feature shape corresponding to the best candidate feature.

Particular implementations can include one or more of the following features. The candidate feature is a candidate pupil and the feature shape is an ellipse. Fitting the parameterized shape to the image includes applying an iterative process varying shape parameters. The parameterized shape encloses pixels in the image, and fitting the parameterized shape to the image includes summing functions of values of the pixels enclosed by the parameterized shape to compute an inner value, summing functions of values of pixels in the image outside of the parameterized shape to compute an outer value, and maximizing a difference between the inner value and the outer value. Maximizing a difference includes performing numerical optimization. The values of the pixels enclosed by the parameterized shape and the values of pixels outside of the parameterized shape include redness values and/or brightness values. The parameterized shape encloses a group of pixels in the image, and fitting includes varying shape parameters to increase a confidence that the group of pixels enclosed by the parameterized shape both (i) includes only pixels representing a feature in the image, and (ii) includes all pixels representing the feature in the image. Selecting the best candidate feature includes selecting a candidate feature having a highest confidence that the group of pixels forming the respective candidate feature both (i) includes only pixels representing a feature in the image, and (ii) includes all pixels representing the feature in the image.

Identifying the one or more candidate features includes defining a search region in the image, the search region enclosing a group of pixels in the image, multiplying a value of each respective pixel in the search region by a coordinate indicating a location in the image of the respective pixel to compute a weighted coordinate value for the respective pixel, and calculating initial parameters of the parameterized shape using the weighted coordinate values of the pixels in the search region. The value of each respective pixel includes a redness value and/or a brightness value. The parameterized shape is an ellipse. The search region is circular. Parameters of the parameterized shape are calculated at multiple locations in the image. Search regions having multiple sizes are defined. An initial value of each respective pixel is computed, a median value of pixels in the image in a region surrounding the search region is computed, a center point for a sigmoid function is computed using the median value, and the sigmoid function is applied to the initial value of each respective pixel to compute the value for each respective pixel. The search region is defined using a single user-specified location in the image, using an output of a face detector, or using an output of an eye detector. The appearance of a feature in the image is altered using the feature shape.

In another aspect, the invention features a method that calculates initial values of parameters defining a shape, where the shape encloses an inner group of pixels in an image, and the initial values define the shape to cover a region in the image identified as possibly containing a feature. An inner value is computed using values of the pixels in the inner group of pixels, and an outer value is computed using values of pixels in an outer group of pixels in the image, the outer group of pixels being outside the shape. The parameters of the shape are varied to change the inner value relative to the outer value.

Particular implementations can include one or more of the following features. The parameters of the shape are varied using a numerical optimization procedure to maximize a function. The function is a function of a difference between the inner value and the outer value. Calculating the initial values of the parameters defining the shape includes defining a search region in the image, where the search region encloses a group of pixels in the image, multiplying a value of each respective pixel in the search region by coordinates indicating a location in the image of the respective pixel to compute a weighted coordinate value for the respective pixel, and calculating the initial values of the parameters defining the shape using the weighted coordinate value of each pixel in the search region. Computing an inner value includes summing functions of values of pixels in the inner group of pixels, and computing an outer value includes summing functions of values of pixels in the outer group of pixels. A search region in the image is defined, where the search region encloses the inner and outer groups of pixels. A median value of pixels in the image in a region surrounding the search region is computed. A center point for a sigmoid function is computed using the median value. The values of the pixels in the inner group of pixels and the values of the pixels in the outer group of pixels are computed using the sigmoid function. Computing the outer value includes uniformly scaling the shape by a factor greater than one to obtain an outer shape, the outer group of pixels being enclosed by the outer shape. Computing the inner value includes weighting the value of each pixel in the inner group of pixels according to the proximity of the respective pixel to the shape and the proximity of the respective pixel to the outer shape, and computing the outer value includes weighting the value of each pixel in the outer group of pixels according to the proximity of the respective pixel to the shape and the proximity of the respective pixel to the outer shape. The values of the pixels in the inner group of pixels and the values of the pixels in the outer group of pixels are redness values and/or or brightness values. The shape is an ellipse, and the feature is a red-eye pupil.

In yet another aspect, the invention features a method that includes defining an inner region and a surrounding region in an image made up of pixels having values, the inner region being enclosed by the surrounding region, the inner region including an inner group of pixels in the image and the surrounding region including a surrounding group of pixels in the image that are not included in the inner region. An adjustment value is calculated using the values of the pixels in the surrounding group of pixels, and the adjustment value is used to calculate adjusted values for the pixels in the inner region. A feature-locating process is applied to the adjusted values for the pixels in the inner region.

Particular implementations can include one or more of the following features. Calculating the adjustment value includes calculating a mean, a median, a mode, and/or a histogram of the values of the pixels in the surrounding group of pixels. Using the adjustment value to calculate the adjusted values includes applying a sigmoid function to the values of the inner group of pixels, where a center point of the sigmoid function is calculated using the adjustment value. The operations of defining an inner region and a surrounding region, calculating an adjustment value, using the adjustment value to calculate adjusted values, and applying the feature-locating process are repeated so as to apply the feature-locating process at multiple locations in the image. Repeating the operation of defining the inner region includes defining inner regions having multiple sizes. The inner region is a circular region and the surrounding region is an annular region. The feature-locating process is a pupil-locating process. The values of the pixels in the surrounding group of pixels are redness values and/or brightness values.

In yet another aspect, the invention features a method that includes searching an image to find one or more first candidate features, where each first candidate feature is a group of pixels in the image that satisfies a first pattern-matching criterion. The method also includes searching only within each first candidate feature to find one or more second candidate features, where each second candidate feature is a group of pixels in a first candidate feature that satisfies a second pattern-matching criterion. Every first candidate feature within which no second candidate feature is found is rejected as a valid feature, and every first candidate feature within which one or more second candidate features are found is accepted as a valid feature. The method can also include the steps of searching only within each valid feature to find one or more third candidate features and modifying an appearance of each third candidate feature.

In yet another aspect, the invention features a method that includes performing a first search in a digital image to find candidate faces, where each candidate face found is a group of pixels in the digital image that satisfies a first pattern-matching criterion. A second search is performed in the digital image to find candidate eyes, where each candidate eye found is a group of pixels in the digital image that satisfies a second pattern-matching criterion. A third search is performed within each candidate face that includes at least one overlapping candidate eye to find red pupils, where each red pupil found is a group of pixels in the digital image. A color modification process is applied to the red pupils.

Particular implementations can include one or more of the following features. Performing the third search to find the red pupils includes searching within a region centered at a location of a candidate eye. Performing the third search to find the red pupils includes searching for a red pupil within a predicted region if a candidate face is overlapped by only one candidate eye and the overlapping candidate eye includes a corresponding red pupil, where the predicted region excludes a location of the overlapping candidate eye. The first search and the second search are performed on luminance information associated with pixels in the image. The first search, the second search, and the third search are performed automatically without user intervention. The second search is performed only within the candidate faces found in the first search.

These general and specific aspects may be implemented using a computer program product, a method, a system, or any combination of computer program products, methods, and systems.

The invention can be implemented to realize one or more of the following advantages. Multiple pupils are detected accurately without prior information about the size or location of the pupils. The process adapts to the surroundings and orientation of the pupil. Red-eye effects are located reliably with little or no user intervention. The number of false positives is low and the process is fast.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
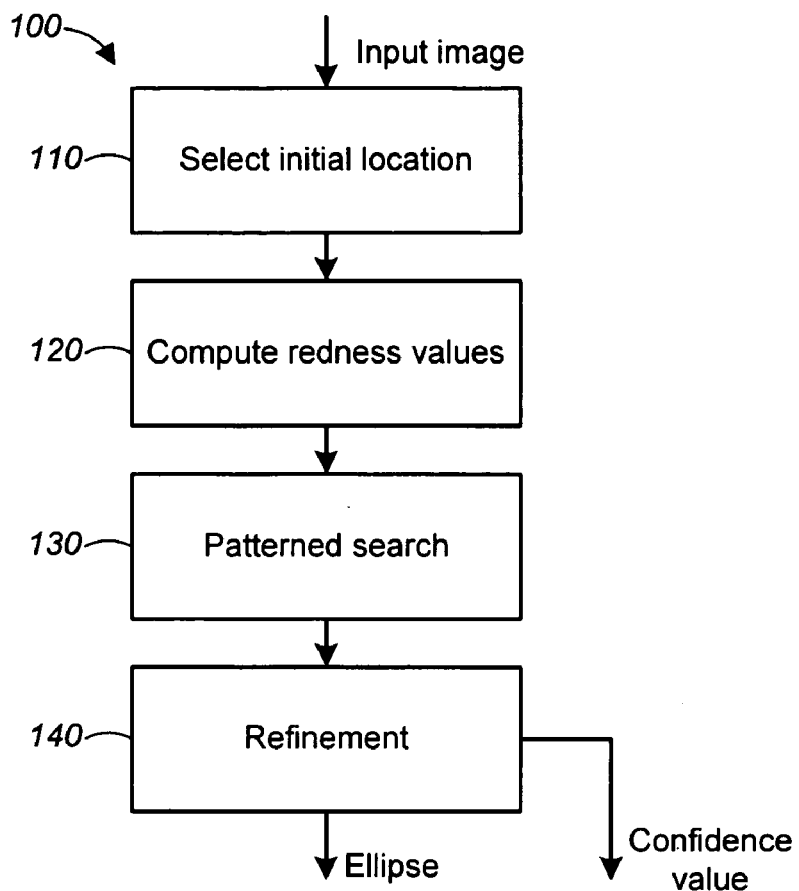
FIG. 1 is a block diagram of a process for locating red-eye effects.

FIG. 1 shows a process 100 for locating red-eye effects precisely. A user selects an initial location in an image (step 110). Redness values are computed for pixels in a region of the image around the initial location (step 120). Process 100 employs a patterned search (step 130), centered on the initial location. The patterned search ranges spatially and in scale searching for a well-delineated red ellipse. An ellipse is used to model a pupil, because not all pupils in images are circular. The patterned search determines the redness of an ellipse independently of the brightness of the ellipse and adapts to surrounding skin tones. The patterned search results in a best estimated red ellipse. The best estimated ellipse is processed in a refinement stage (step 140) to obtain an ellipse that fits tightly around the red pupil. Process 100 also produces a confidence value for the detected pupil. The confidence value can be used to determine the success or failure of the detection process.

The computed redness values (step 120) are per-pixel mappings of RGB pixel values to scalar values in the range 0 to 1.

Figure 2:
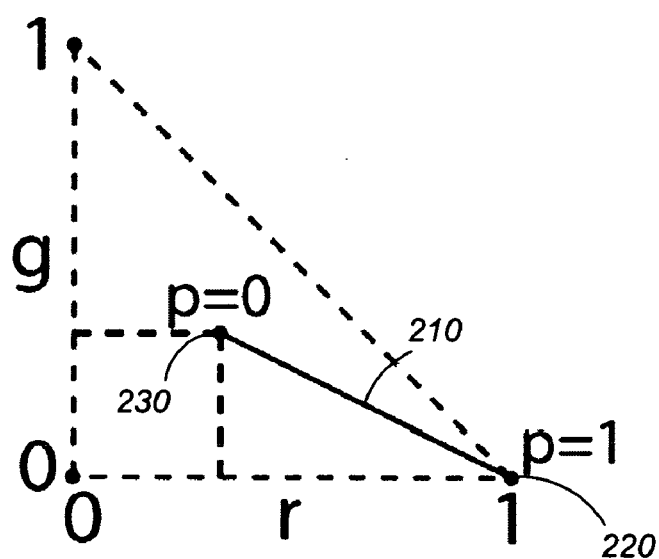
FIG. 2 illustrates a projection of color values.

One mapping is illustrated in FIG. 2, where each redness value is expressed in terms of the luminance-independent color coordinates (r, g). The color coordinates (r, g) are obtained for a pixel by dividing the red and green component values of the pixel's color by the sum of the red, green, and blue component values:

$$r=R/(R+G+B), \text{ and}$$

$$g=G/(R+G+B).$$

The color coordinates (r, g) are projected onto a line segment 210 joining pure red 220 (r=1, g=0) and gray 230 (r=⅓, g=⅓). The redness value (p) is calculated by positioning the projection along the line segment 210 according to the equation:

$$p=\max(0,\min(1,(r-1/3)*6/5-(g-1/3)*3/5)).$$

A pure red pixel has redness value 1, while a gray, green, or blue pixel has redness value 0.

Figure 3:
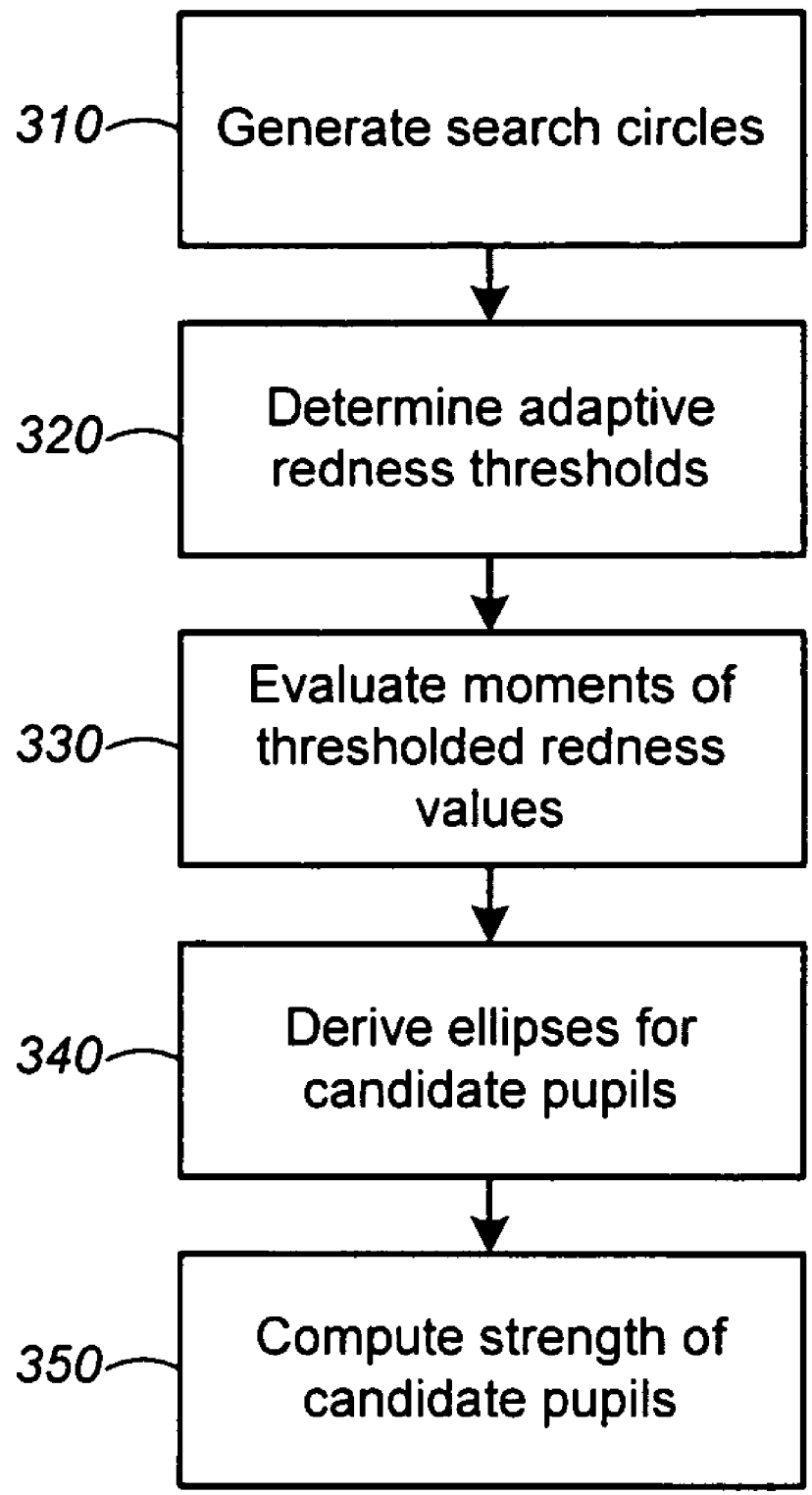
FIG. 3 is a block diagram of a process for locating a best candidate pupil.

FIG. 3 illustrates the patterned search (FIG. 1, step 130) with which a rough candidate pupil is located. A sequence of search circles is generated (step 310). The search circles have varying sizes and spatial offsets relative to the initial search location. For each search circle, an adaptive redness threshold is determined (step 320) based on the median redness in the skin annulus surrounding the respective search circle. The moments of the thresholded redness values within each search circle are evaluated (step 330), and candidate pupil ellipses are derived from the moments (step 340). The strength of each candidate pupil is evaluated (step 350). The candidate having the greatest strength over all the considered search circles constitutes the result of the patterned search stage. Search circles that are not entirely within the bounds of the image typically are not considered.

The search circles generated in step 310 range in size and offset relative to the coordinates ($c_x$, $c_y$) of the initial location. A simple rectangular grid search pattern is used in one implementation.

Figure 4:
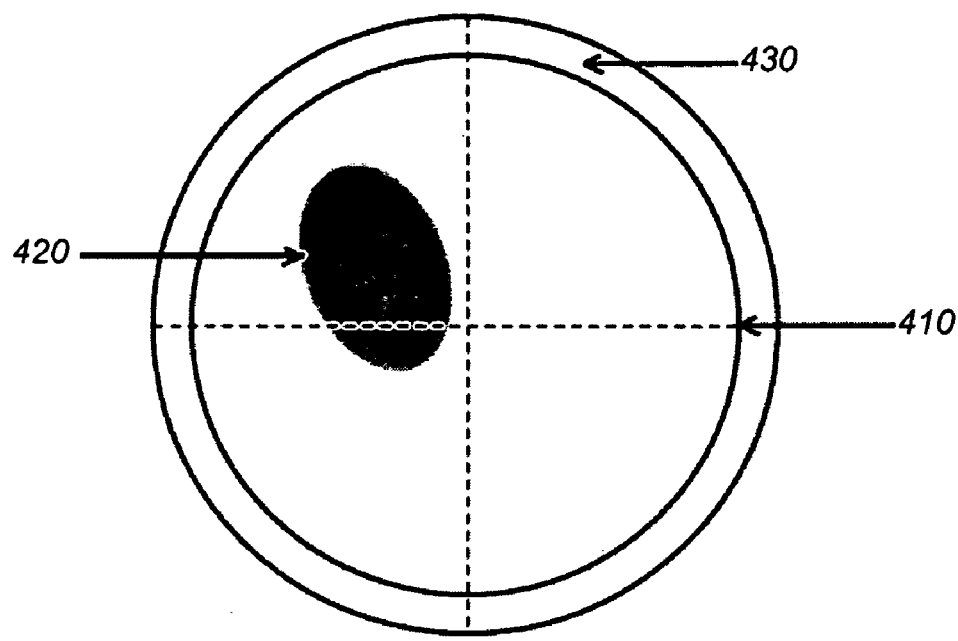
FIG. 4 shows a pupil, a search circle, and a skin annulus.

FIG. 4 shows a search circle 410 that is parameterized by center coordinates ($s_x$, $s_y$) and radius (r). The search circle radius values range geometrically as:

$$r(n)=r_{min}*r_{step}^n, \text{ for } n=0,\ldots, \text{floor}((\log(r_{max})-\log(r_{min})/\log(r_{step})),$$

where $r_{min}$, $r_{max}$, and $r_{step}$ are fixed parameters specifying the minimum and maximum search radii in pixels and a step size for the search. The maximum and minimum search radii give rough upper and lower bounds on the size of a pupil. Reasonable values for these parameters are $r_{min}=2$, $r_{max}=\min(\text{image width, image height})/4$, and $r_{step}=1.2$.

For each radius value, the offsets relative to the initial location range as $$s_x(j,n)=c_x+j*d*r(n), \text{ for } j=-D,\ldots, D, \text{ and}$$

$$s_y(k,n)=c_y+k*d*r(n), \text{ for } k=-D,\ldots, D,$$

where d=2 and D=2. The search pattern is designed so that a red pupil 420 will be completely contained in at least one search circle that does not contain any other significant redness (e.g., another pupil or background pixels). For each search circle that satisfies these two criteria, a rough estimate of the pupil ellipse parameters is obtained by evaluating moments of the (thresholded) redness values within the respective circle.

Sometimes skin near the eye contains a significant amount of redness. The red pupil 420 can also have low redness, especially in low lighting. Therefore, the redness value is thresholded adaptively to discriminate the red pupil 420 from the skin color. The assumption is made that the search circle 410 contains the red pupil 420 and is not much larger than twice the size of the red pupil 420. To estimate the redness of the surrounding skin, a skin annulus 430 is defined, where the skin annulus 430 is concentric with the search circle 410. The inner radius of the skin annulus 430 is equal to the search circle radius, and the skin annulus 430 has a fixed absolute thickness (e.g., 4 pixels). The median redness value for the pixels within the skin annulus 430 is determined by evaluating a redness histogram. The median redness value is considered to reflect the skin redness surrounding the eye.

Figure 5:
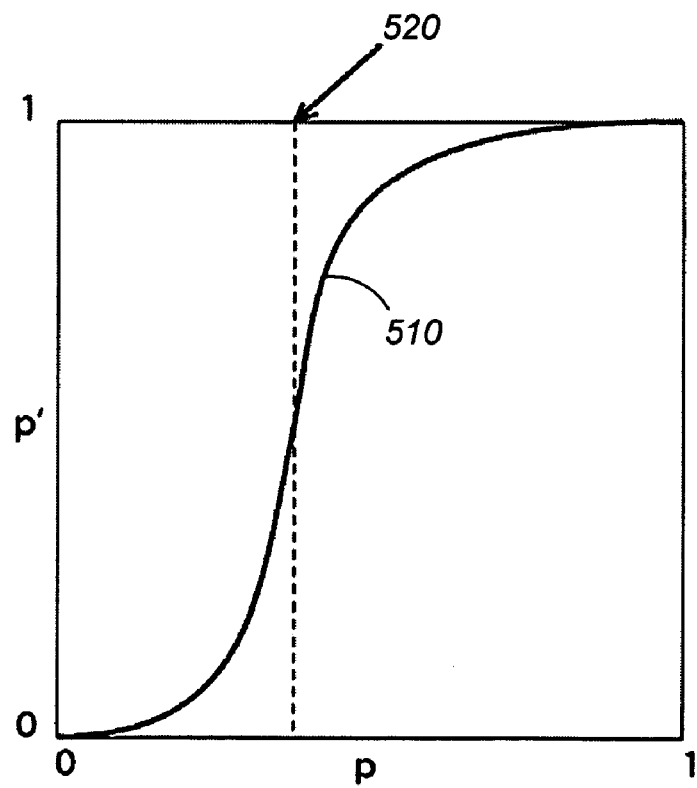
FIG. 5 shows an adaptive thresholding function.

FIG. 5 shows a soft threshold function 510 calculated from the median redness value. The soft threshold function 510 is calculated for the redness (p) as:

$$p'=\text{sigmoid}(p*\text{gain}_{red}-\text{bias}_{red}), \text{ where}$$

$$\text{sigmoid}(x)=\exp(x)/(1+\exp(x)),$$

$$\text{gain}_{red}=20, \text{ and}$$

$$\text{bias}_{red}=\min(0.9,\text{redness}_{median}+0.1).$$

The adaptively thresholded redness value (p') can be interpreted as the probability that a pixel is part of the red pupil given the pixel's redness value (p). The value of $\text{bias}_{red}$ 520 determines the value of p at which p'=0.5 (the center point of the sigmoid function). The value of $\text{gain}_{red}$ influences the steepness of the transition of the soft threshold function 510.

Parameters for an ellipse representing a candidate pupil are estimated in a search circle that completely contains a candidate pupil and does not contain other stray red pixels. The candidate pupil ellipse parameters are estimated using the first- and second-order spatial moments of p':

$$m_x=\Sigma(p'*x)/\Sigma(p'),$$

$$m_y=\Sigma(p'*y)/\Sigma(p'),$$

$$m_{xx}=(p'*x^2)/\Sigma(p')-m_x^2,$$

$$m_{xy}=\Sigma(p'*x*y)/\Sigma(p')-m_x*m_y, \text{ and}$$

$$m_{yy}=\Sigma(p'*y^2)/\Sigma(p')-m_y^2,$$

where x and y are the image coordinates of the pixel having the value p'. The summations are over the pixels contained in the search circle.

Figure 6:
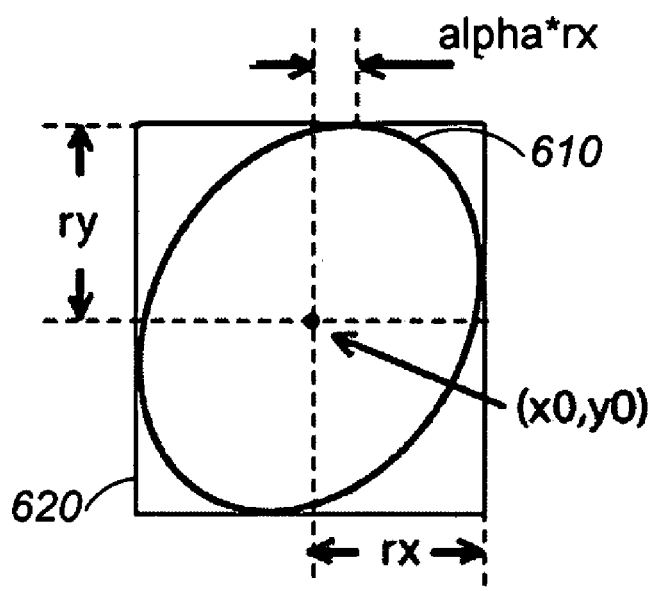
FIG. 6 illustrates parameters of an ellipse.

As shown in FIG. 6, the general ellipse 610 used to model the candidate pupil is determined by five parameters: $x_0$, $y_0$, $r_x$, $r_y$, and alpha. The point ($x_0$, $y_0$) is the center of the ellipse 610. The parameters $r_x$ and $r_y$ are the horizontal and vertical radii of the image-axis-aligned bounding box 620 that encloses the ellipse 610. The alpha parameter (abs(alpha)<1) determines the skew of the ellipse 610. In terms of this parameterization, the implicit formula for the ellipse 610 is:

$$a*u^2+2*b*u*v+a*v^2=1, \text{ where}$$

$$u=(x-x_0)/r_x,$$

$$v=(y-y_0)/r_y,$$

$$a=1/(1-\text{alpha}^2), \text{ and}$$

$$b=-\text{alpha}/(1-\text{alpha}^2).$$

The ellipse parameters are determined from the moments as follows:

$x_0 = m_x$, $y_0 = m_y$, alpha$= m_{xy}/sqrt(m_{xx} * m_{yy})$, $r_x = 2*sqrt(m_{xx}*(1-\text{alpha}^2))$, $r_y = 2*sqrt(m_{yy}*(1-\text{alpha}^2))$.

The estimated candidate pupil ellipse parameters can be checked to verify that the parameters are reasonable for a physical pupil. This particular ellipse parameterization is designed to be stable in the final refinement stage.

An adaptive center-surround operator is used to measure the strength of a candidate pupil in both the patterned search (FIG. 1, step 130) and the final refinement (step 140). A confidence value is produced for each candidate pupil using the strength of the corresponding candidate pupil (e.g., by mapping the pupil strength to a confidence value in the range of 0 to 1).

Figure 7:
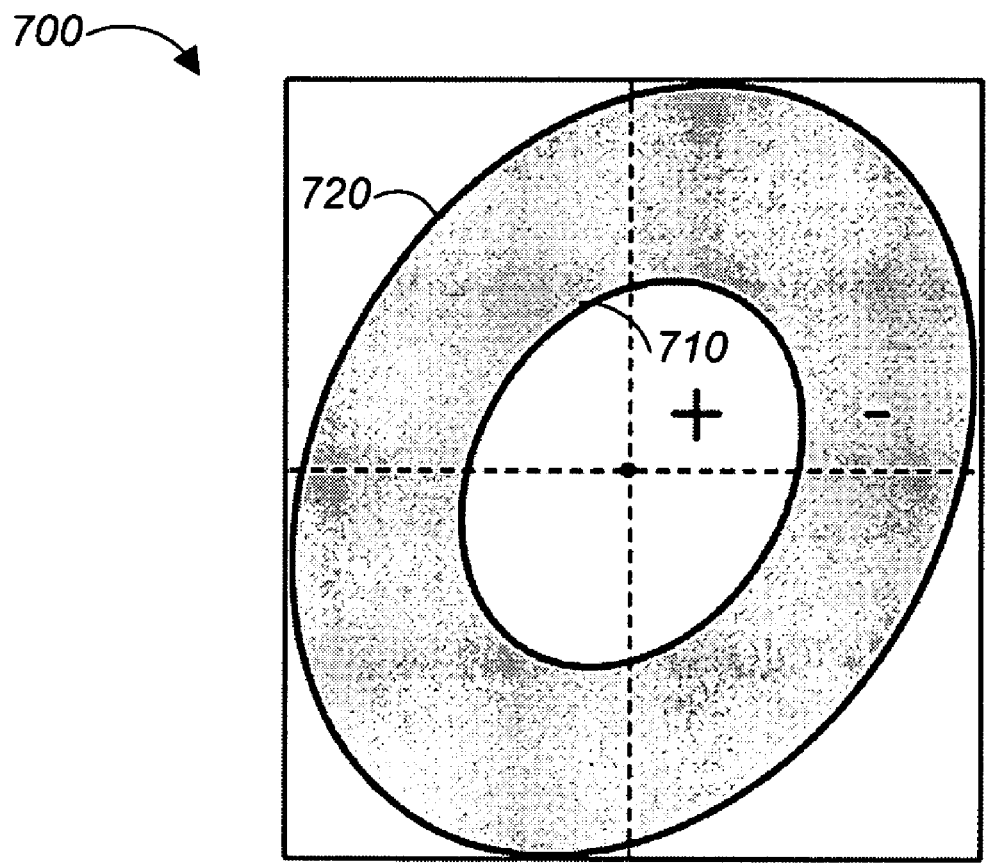
FIG. 7 shows a strength operator.

FIG. 7 illustrates an operator 700 used to evaluate candidate pupil strength. The operator 700 is made up of two concentric ellipses. The inner ellipse 710 is the candidate pupil ellipse and the outer ellipse is a surround ellipse 720, which is obtained from the inner ellipse 710 by uniformly scaling the inner ellipse 710 by a constant factor (e.g., 2). The strength of a candidate pupil is defined to be the sum of the thresholded redness values (p') within the inner ellipse 710 minus the sum of the thresholded redness values that are within the surround ellipse 720 but not within the inner ellipse 710. Specifically, strength$_{pupil} = \Sigma(p'*(2*\text{beta}_{inner} - \text{beta}_{surround})*\text{beta}_{surround})/\Sigma(\text{beta}_{surround})$, where beta$_{inner}$=sigmoid(paraboloid$_{inner}$*gain$_{paraboloid}$), beta$_{surround}$=sigmoid(paraboloid$_{surround}$*gain$_{paraboloid}$), and gain$_{paraboloid}$=10.

The use of the sigmoid function creates smooth transitions at the ellipse boundaries. The operands of the sigmoid function are two-dimensional paraboloid functions obtained from the implicit formula for the ellipse. Namely, paraboloid$=1 - a*u^2 - 2*b*u*v - a*v^2$, where a, b, u, and v are derived from the ellipse parameters (as well as the pixel's x and y values) for the corresponding ellipse (inner ellipse 710 or surround ellipse 720). The paraboloid function has a unique maximum value (1) at the center of the ellipse, is positive in the interior of the ellipse, zero at the boundary, and negative in the exterior. Applying the sigmoid function to the paraboloid results in an alpha mask that is 1 in the interior, zero in the exterior, and that transitions continuously at the boundary over a finite spatial extent determined by gain$_{paraboloid}$.

The parameters of the ellipse representing the strongest candidate pupil are refined (FIG. 1, step 140), for example, using numerical optimization. Specifically, the strength (strength$_{pupil}$) of the strongest candidate pupil is maximized with respect to the five ellipse parameters ($x_0, y_0, r_x, r_y$, alpha). The ellipse parameters of the strongest candidate emerging from the patterned search stage are used as the initial values for the numerical optimization. A number of multidimensional numerical optimization algorithms exist that can be employed here, such as the simplex method. The simplex method is simple, stable, and does not require direct evaluation of a gradient or Hessian. Details about the simplex method can be found in M. H. Wright, "Direct search methods: Once scorned, now respectable", in *Numerical Analysis* (D. F. Griffiths and G. A. Watson, eds.), Pitman Research Notes in Mathematics, pp. 191-208, Addison Wesley Longman Limited, 1995).

The single-click red-eye locator described above uses an initial user designation of the approximate location of a pupil, as well as rough bounds on the pupil size. A user also can designate both an approximate location and an approximate size of the pupil (e.g., by drawing a rectangle around the pupil). Alternatively, it is possible to obtain a rough initial estimate of the pupil location and size without user action by using an automatic face detector (e.g., a method described in P. Viola, M. Jones, "Robust real-time object detection," 2nd International Workshop on Statistical and Computational Theories of Vision—Modeling, Learning, Computing, and Sampling, July 2001, M. Jones, P. Viola, "Fast multi-view faces detection," CVPR 2003 demo, or M. H. Yang, D. J. Kriegman, N. Ahuja, "Detecting faces in images: a survey," IEEE Trans. Pattern Analysis and Machine Intelligence, 24(1), January 2002). The rough initial estimate is used to obtain the initial location and a rough size estimate for the process for locating red-eye effects described above. Specifically, the face detector is applied to an input image and locates occurrences of faces in the image, along with their respective sizes, without user interaction. A typical output of a face detector is a list of rectangular areas, within which each detected face resides, along with coarse classifications of the detected face orientations relative to the camera. These locations, sizes, and orientations are only approximate. Therefore, for each detected face, an approximate prediction is made as to the locations and sizes of the pupils belonging to the face. Starting from the approximate predicted locations and sizes of the pupils associated with each detected face, the red-eye locator operates as described above and outputs resulting pupils and confidence values. The parameters of each resulting pupil are compared with the predicted location as given by the face detector to verify consistency of the result. In addition, the strength of each resulting pupil can be compared with a threshold to qualify each resulting pupil as being a true red pupil. If both criteria are satisfied, the detected pupils are accepted for further processing (e.g., to correct the redness). A similar method using an eye detector instead of, or in conjunction with, a face detector can also be employed.

Figure 8:
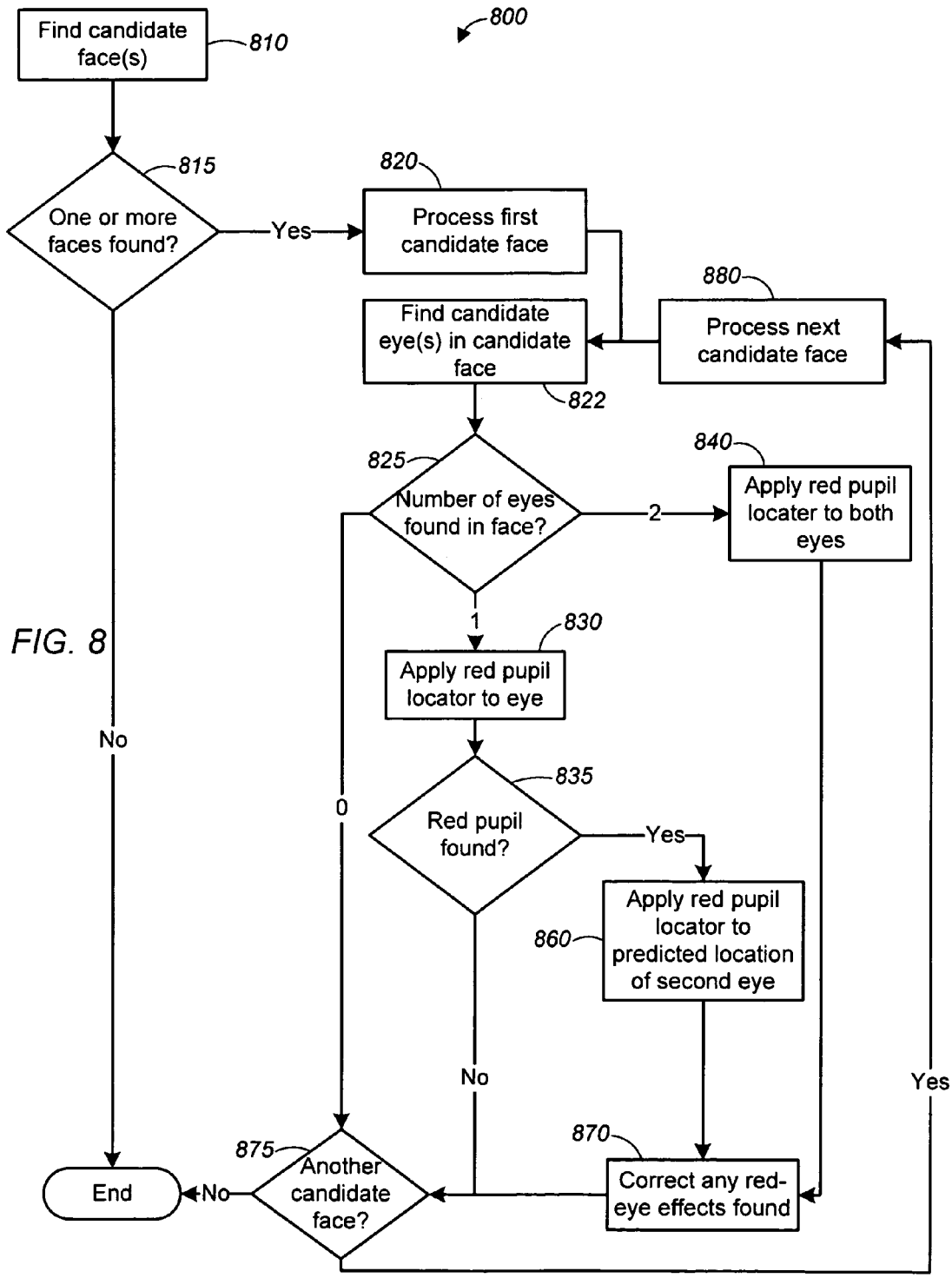
FIG. 8 is a block diagram of a process for hierarchically locating red-eye effects.

FIG. 8 shows a process 800 for hierarchically locating and correcting red-eye effects in an image. The process 800 can find and correct multiple occurrences of a red-eye effect in the image without requiring user input or intervention. The image is analyzed in a face-finding step to find groups of pixels that may correspond to faces (step 810). These groups of pixels are called candidate faces and can be found, for example, using a method described in U.S. patent application Ser. No. 11/042,942, filed on Jan. 24, 2005, entitled, "Detecting Objects in Images using a Soft Cascade," the entire contents of which are hereby incorporated by reference. The output of the face-finding step (step 810) typically includes an outline (e.g., a rectangle or an oval) around the group of pixels forming the candidate face and can also include pose information (e.g., information about an orientation or tilt of the face) and predicted locations and sizes of eyes included in the candidate face.

Process 800 determines whether at least one candidate face is found in the image (step 815). If no candidate faces are found, the process 800 ends. If at least one candidate face is found, the first candidate face is processed (step 820). Process 800 searches for groups of pixels that may correspond to eyes (step 822) within the candidate face. The groups of pixels that may correspond to eyes are called candidate eyes and can also be located using a method described in U.S. patent application Ser. No. 11/042,942. The search for candidate faces and the search for candidate eyes can each be performed using luminance values of the pixels in the image without regard to the colors of the pixels.

In one implementation, the search for candidate eyes in a candidate face is conducted in two rectangular regions—one for each anticipated eye. The rectangular search regions are each 40% as large in each dimension as a rectangle outlining the candidate face and are centered halfway between the center and the edge of the rectangle outlining the candidate face on the end where eyes are predicted to be. Seven eye size scales are used to search for candidate eyes within the two rectangular search regions. The center eye size scale is equal to the predicted size of an eye, and the remaining six eye size scales are geometrically derived from the center eye size scale by multiplying the center eye size scale by a factor of $1.15^n$, where n=−3, −2, −1, 1, 2, and 3. If the best result from the search in one of the search regions exceeds a threshold, the best result is used as the candidate eye for that search region. If no result in the search region exceeds the threshold, no candidate eye is found in the search region.

If no candidate eyes are found in a candidate face, the process 800 assumes that the candidate face is not a valid face, and the candidate face is not processed further. Process 800 determines whether any unprocessed candidate faces remain (step 875). If another unprocessed candidate face exists, it is processed (step 880). If no unprocessed candidate faces remain, the process 800 ends.

If only one candidate eye is found in a candidate face, the process for locating red-eye effects (the red pupil locator) described above in reference to FIGS. 1-7 is applied to a portion of the candidate face centered at the candidate eye (step 830). In one implementation, the expected size of a pupil is 10% of the size of the corresponding candidate eye (or a predicted eye size) with a minimum pupil size of 5% of the candidate eye size and a maximum pupil size of 30% of the candidate eye size. If the red pupil locator does not find any red-eye effects whose confidence value exceeds a threshold near the candidate eye, the candidate face is not processed further. If a red-eye effect is found near the single candidate eye, the red pupil locator also is applied to a portion of the candidate face centered at a predicted location for a second eye (step 860). The predicted location for the second eye can be supplied by the face detector or can be calculated based on the size, location, and orientation (if it is available) of the candidate face. The red-eye effect near the candidate eye and any red-eye effect found near the predicted location for the second eye is corrected (step 870).

If two candidate eyes are found, the red pupil locator is applied to portions of the candidate face centered at the candidate eyes (step 840), and any detected red-eye effects are corrected.

The hierarchical search technique described above tests the hypothesis that a candidate face is actually a face by performing a second, independent search within the candidate face for eyes, which are an expected part of a face. The hierarchical search technique can reduce a number of false faces found. A search within the candidate face for a second feature (e.g., a mouth) can be used in conjunction with, or in place of, the search for eyes and used to validate a candidate face.

The hierarchical search technique can be used to decrease a number of false positive results from a search for a feature by searching within a first candidate feature for a second candidate feature. If the second candidate feature is not found within the first candidate feature, the first candidate feature is not considered to be a valid feature. For example, an image can be searched for candidate automobiles, and the candidate automobiles can be validated by searching for one or more wheels included on the automobiles.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors (e.g., a graphics processing unit), and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a digital camera, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention can be implemented in a mobile device. For example, the processes described in this specification, including the method steps of the invention, can be performed on or implemented in a digital camera or mobile telephone.

The invention can be implemented in a system that performs the processes described in this specification. The system can include specific components that are operable to perform steps of the processes. For example, the system can include a feature-identification engine, a shape-generating engine, an image-editing engine, a strength-measuring engine, a refinement engine, and a compensation engine. The feature-identification engine detects features such as red eye in images. The shape-generating engine fits a shape to a detected feature, and the image-editing engine alters the appearance of the feature using the shape. The strength-measuring engine detects the strength of a feature enclosed in the shape, and the refinement engine adjusts the shape to increase the strength of the feature. The compensation engine computes adjusted pixel values in a region of the image using pixel values surrounding the region. The system can also include a digital video camera, a digital still image camera, and/or a scanner.

The invention has been described in terms of particular embodiments. Other embodiments are within the scope of the following claims. For example, the steps of the invention can be performed in a different order and still achieve desirable results. An attribute other than the color value of pixels (e.g., the brightness value of pixels) can be used to locate pupils.

The processes described in this specification can be used as feature-locating processes to locate features other than pupils. For example, features such as teeth, blemishes, buttons, or jewelry can be located. The processes can be used in medical-imaging, aerial-imaging, or object-tracking applications.

What is claimed is:

1. A computer program product tangibly embodied on a computer-readable medium, the computer program product comprising instructions operable to cause a computer to perform operations comprising:
   performing a first search in a digital image to find candidate faces, each candidate face found in the first search being a group of pixels in the digital image that satisfies a first pattern-matching criterion;
   performing a second search in the digital image to find candidate eyes in the candidate faces, each candidate eye found in the second search being a group of pixels in the digital image that satisfies a second pattern-matching criterion, wherein:
      when two candidate eyes are found in a found candidate face, performing a third search to find red pupils in the two candidate eyes,
      when only one candidate eye is found in the found candidate face, performing the third search to find red pupils in the one candidate eye and in a predicted region of another eye in the found candidate face, the predicted region excluding a location of the one candidate eye and calculated based on at least one of size, location and orientation of the found candidate face,
      wherein each red pupil found in the third search being a group of pixels in the digital image that satisfies a third pattern-matching criterion defining a red ellipse; and
   applying a color modification process to the red pupils.

2. The computer program product of claim 1, wherein:
   the first search and the second search are performed on luminance information associated with pixels in the image.

3. The computer program product of claim 1, wherein:
   the first search, the second search, and the third search are performed automatically without user intervention.

4. The computer program product of claim 1, wherein performing the second search in the digital image to find candidate eyes includes searching with a plurality of eye size scales, wherein a center eye size scale is equal to a predicted size of a candidate eye and a remainder of the plurality of eye size scales are geometrically derived from the center eye size scale.

5. The computer program product of claim 4, wherein the plurality of eye size scales are geometrically derived from the center eye size scale by multiplying the center eye size scale by a factor of $1.15^n$.

6. The computer program product of claim 5, wherein n equals a value from a set of values including −3, −2, −1, 1, 2, and 3.

7. The computer program product of claim 1, wherein performing the third search to find the red pupils in the two candidate eyes includes searching within a region centered at each of the two candidate eyes.

8. The computer program product of claim 1, wherein performing the third search to find the red pupils in the one candidate eye and in the predicted region of the another eye includes searching within a region centered at the one candidate eye and the predicted region of the another eye.

9. A method comprising:
   performing a first search in a digital image to find candidate faces, each candidate face found in the first search being a group of pixels in the digital image that satisfies a first pattern-matching criterion;

performing a second search in the digital image to find candidate eyes in the candidate faces, each candidate eye found in the second search being a group of pixels in the digital image that satisfies a second pattern-matching criterion, wherein:
when two candidate eyes are found in a found candidate face, performing a third search to find red pupils in the two candidate eyes,
when only one candidate eye is found in the found candidate face, performing the third search to find red pupils in the one candidate eye and in a predicted region of another eye in the found candidate face, the predicted region excluding a location of the one candidate eye and calculated based on at least one of size, location and orientation of the found candidate face,
wherein each red pupil found in the third search being a group of pixels in the digital image that satisfies a third pattern-matching criterion defining a red ellipse; and applying a color modification process to the red pupils.

10. The method of claim 9, wherein:
the first search and the second search are performed on luminance information associated with pixels in the image.

11. The method of claim 9, wherein:
the first search, the second search, and the third search are performed automatically without user intervention.

12. The method of claim 9, wherein performing the second search in the digital image to find candidate eyes includes searching with a plurality of eye size scales, wherein a center eye size scale is equal to a predicted size of a candidate eye and a remainder of the plurality of eye size scales are geometrically derived from the center eye size scale.

13. The method of claim 12, wherein the plurality of eye size scales are geometrically derived from the center eye size scale by multiplying the center eye size scale by a factor of $1.15^n$.

14. The method of claim 13, wherein n equals a value from a set of values including −3, −2, −1, 1, 2, and 3.

15. The method of claim 9, wherein performing the third search to find the red pupils in the two candidate eyes includes searching within a region centered at each of the two candidate eyes.

16. The method of claim 9, wherein performing the third search to find the red pupils in the one candidate eye and in the predicted region of the another eye includes searching within a region centered at the one candidate eye and the predicted region of the another eye.

17. A system comprising:
means for acquiring a digital image;
means for performing a first search in the digital image to find candidate faces, each candidate face found in the first search being a group of pixels in the digital image that satisfies a first pattern-matching criterion;
means for performing a second search in the digital image to find candidate eyes in the candidate faces, each candidate eye found in the second search being a group of pixels in the digital image that satisfies a second pattern-matching criterion, wherein:
when two candidate eyes are found in a found candidate face, means for performing a third search to find red pupils in the two candidate eyes,
when only one candidate eye is found in the found candidate face, means for performing the third search to find red pupils in the one candidate eye and in a predicted region of another eye in the found candidate face, the predicted region excluding a location of the one candidate eye and calculated based on at least one of size, location and orientation of the found candidate face,
wherein each red pupil found in the third search being a group of pixels in the digital image that satisfies a third pattern-matching criterion defining a red ellipse; and means for applying a color modification process to the red pupils.

18. The system of claim 17, wherein:
the first search and the second search are performed on luminance information associated with pixels in the image.

19. The system of claim 17, wherein:
the first search, the second search, and the third search are performed automatically without user intervention.

20. The system of claim 17, wherein performing the second search in the digital image to find candidate eyes includes searching with a plurality of eye size scales, wherein a center eye size scale is equal to a predicted size of a candidate eye and a remainder of the plurality of eye size scales are geometrically derived from the center eye size scale.

21. The system of claim 20, wherein the plurality of eye size scales are geometrically derived from the center eye size scale by multiplying the center eye size scale by a factor of $1.15^n$.

22. The system of claim 21, wherein n equals a value from a set of values including −3, −2, −1, 1, 2, and 3.

23. The system of claim 17, wherein performing the third search to find the red pupils in the two candidate eyes includes searching within a region centered at each of the two candidate eyes.

24. The system of claim 17, wherein performing the third search to find the red pupils in the one candidate eye and in the predicted region of the another eye includes searching within a region centered at the one candidate eye and the predicted region of the another eye.

* * * * *

UNITED STATES PATENT AND TRADEMARK OFFICE
CERTIFICATE OF CORRECTION

| | | |
|---|---|---|
| PATENT NO. | : 7,623,707 B2 | |
| APPLICATION NO. | : 11/096349 | |
| DATED | : November 24, 2009 | |
| INVENTOR(S) | : Brandt | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 831 days.

Delete the phrase "by 831 days" and insert -- by 1063 days --

Signed and Sealed this

Seventeenth Day of August, 2010

David J. Kappos
*Director of the United States Patent and Trademark Office*